US010481555B2

United States Patent
Vouillamoz

(10) Patent No.: US 10,481,555 B2
(45) Date of Patent: Nov. 19, 2019

(54) SYSTEM AND METHOD OF FORCE DISPLACEMENT INSENSITIVE TO TEMPERATURE CHANGES

(71) Applicant: Preciflex SA, Neuchâtel (CH)

(72) Inventor: Lucien Vouillamoz, Feusisberg (CH)

(73) Assignee: PRECIFLEX SA, Neuchâtel (CH)

(*) Notice: Subject to any disclaimer, the term of this patent is extended or adjusted under 35 U.S.C. 154(b) by 97 days.

(21) Appl. No.: 15/541,491

(22) PCT Filed: Jan. 7, 2016

(86) PCT No.: PCT/IB2016/000004
§ 371 (c)(1),
(2) Date: Jul. 5, 2017

(87) PCT Pub. No.: WO2016/110778
PCT Pub. Date: Jul. 14, 2016

(65) Prior Publication Data
US 2018/0267469 A1   Sep. 20, 2018

Related U.S. Application Data

(60) Provisional application No. 62/100,828, filed on Jan. 7, 2015.

(51) Int. Cl.
*F16J 3/04* (2006.01)
*G04B 1/26* (2006.01)
*G04B 27/00* (2006.01)

(52) U.S. Cl.
CPC .............. *G04B 1/26* (2013.01); *F16J 3/04* (2013.01); *G04B 1/265* (2013.01); *G04B 27/00* (2013.01); *G04B 27/002* (2013.01)

(58) Field of Classification Search
CPC ........ G04B 1/26; G04B 27/002; G04B 1/265; G04B 27/00; F16J 3/04
See application file for complete search history.

(56) References Cited

U.S. PATENT DOCUMENTS

| 1,730,448 | A | 10/1929 | Bryce |
| 4,207,746 | A | 6/1980 | McFarlin |
| 7,100,389 | B1* | 9/2006 | Wayburn ............ F25D 19/006 324/750.08 |
| 9,703,261 | B2* | 7/2017 | Vouillamoz ............ F04B 53/14 |
| 10,031,481 | B2* | 7/2018 | Jaccard .................. G04B 1/14 |
| 2015/0098665 | A1* | 4/2015 | Vouillamoz ............ G04B 1/265 383/40 |

FOREIGN PATENT DOCUMENTS

| WO | WO 2004/008053 A1 | 1/2004 |
| WO | WO 2013/153436 A2 | 10/2013 |

OTHER PUBLICATIONS

International Search Report, International Patent Application No. PCT/IB2016/000004; dated May 25, 2016.

* cited by examiner

*Primary Examiner* — Thomas E Lazo
(74) *Attorney, Agent, or Firm* — Da Vinci Partners LLC; John Moettelli

(57) ABSTRACT

A dual bellows system and method that includes a main bellows which interacts with a thermally compensating bellows, whereby interaction of the main bellows with the thermally compensating bellows results in a transfer of force and/or displacement that is insensitive to temperature changes.

16 Claims, 1 Drawing Sheet

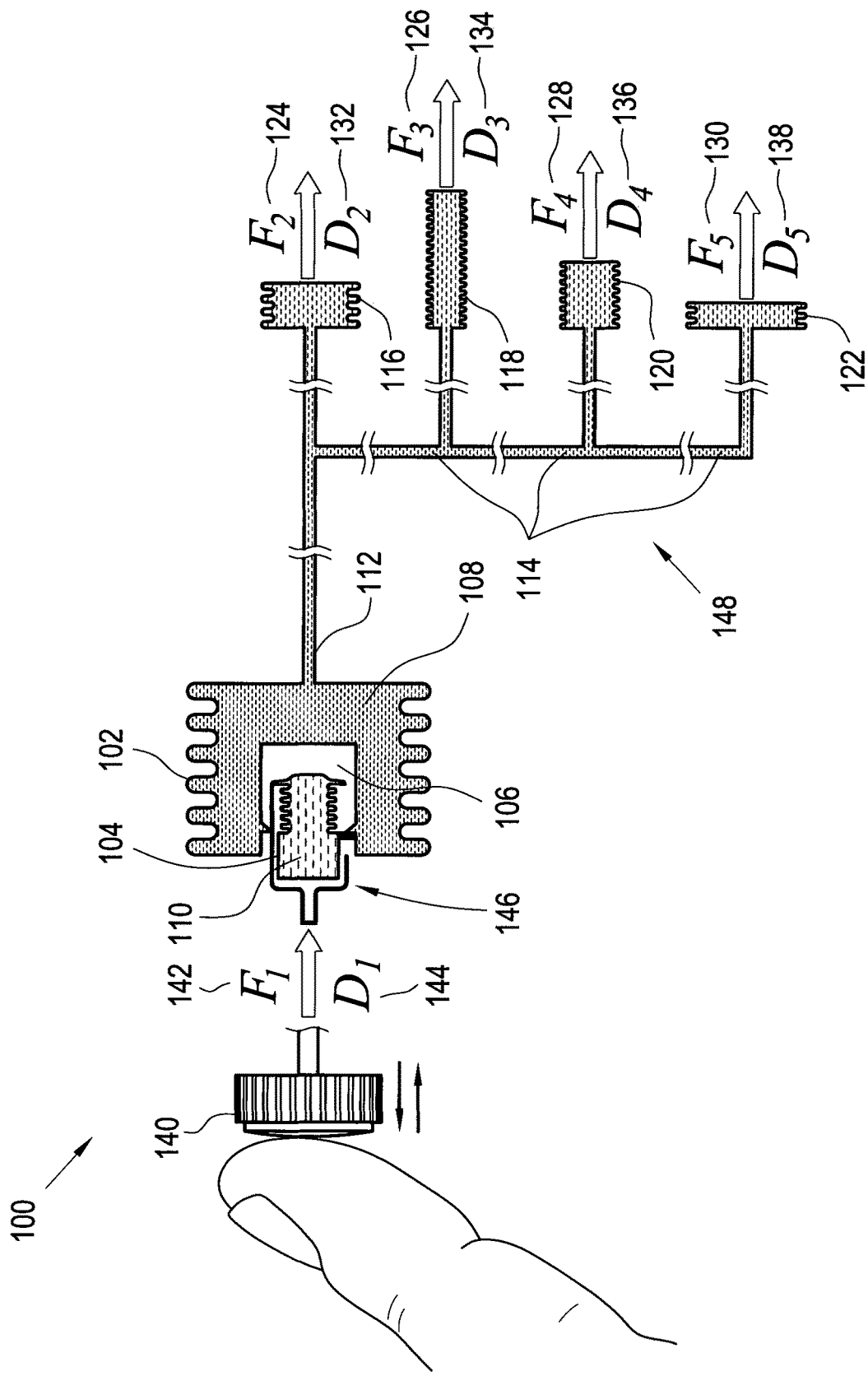

SYSTEM AND METHOD OF FORCE DISPLACEMENT INSENSITIVE TO TEMPERATURE CHANGES

CROSS REFERENCE TO RELATED APPLICATIONS

This application is the National Stage of International Application No. PCT/IB2016/000004, filed Jan. 7, 2016, which claims benefit under 35 USC § 119(a), to US provisional patent application Ser. No. 62/100,828, filed Jan. 7, 2015.

COPYRIGHT & LEGAL NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. Further, no reference to third party patents or articles made herein is to be construed as an admission that the present invention is not entitled to antedate such material by virtue of prior invention.

BACKGROUND OF THE INVENTION

The system and method generally relates to transfer of fluid force displacement insensitive to temperature changes, in particular for watches for example.

Systems which transfer of forces via fluids are subject to inaccuracies due to thermal expansion of the fluid. In particular, when more than one fluid is used in the system, differing thermal expansions increase the difficulty of overcoming these inaccuracies.

Consequently, what is needed is a system which a transfer of force and/or displacement is insensitive to temperature changes.

SUMMARY OF THE INVENTION

A dual bellows system and method is provided that includes a main bellows which interacts with a thermally compensating bellows, whereby interaction of the main bellows with the thermally compensating bellows results in a transfer of force and/or displacement that is insensitive to temperature changes.

BRIEF DESCRIPTION OF THE DRAWINGS

FIG. 1 is a schematic representation of a system for transfer of force displacement insensitive to temperature changes.

Those skilled in the art will appreciate that elements in the figures are illustrated for simplicity and clarity and have not necessarily been drawn to scale. For example, dimensions may be exaggerated relative to other elements to help improve understanding of the invention and its embodiments. Furthermore, when the terms 'first', 'second', and the like are used herein, their use is intended for distinguishing between similar elements and not necessarily for describing a sequential or chronological order. Moreover, relative terms like 'front', 'back', 'top' and 'bottom', and the like in the description and/or in the claims are not necessarily used for describing exclusive relative position. Those skilled in the art will therefore understand that such terms may be interchangeable with other terms, and that the embodiments described herein are capable of operating in other orientations than those explicitly illustrated or otherwise described.

DETAILED DESCRIPTION OF THE PREFERRED EMBODIMENT(S)

The following description is not intended to limit the scope of the invention in any way as they are exemplary in nature and serve to describe the best mode of the invention known to the inventors as of the filing date hereof. Consequently, changes may be made in the arrangement and/or function of any of the elements described in the disclosed exemplary embodiments without departing from the spirit and scope of the invention.

Referring now to FIG. 1, the invention describes a system 100 particularly adaptable to a wrist watch which displays time via a fluid meniscus in a capillary tube, such as described in PCT/IB2010/002054, filed Aug. 20, 2010; PCT/IB2010/002055, filed Aug. 20, 2010; PCT/US 12/48044, filed Jul. 25, 2012; PCT/IB2012/002591, filed Dec. 5, 2012; PCT/IB2012/002641, filed Dec. 10, 2012; PCT/IB2013/000660, filed Apr. 12, 2013; PCT/EP2010/063567, filed Sep. 15, 2010; PCT/IB2014/000373, filed Mar. 17, 2014; PCT/IB2014/001624, filed Aug. 26, 2014, and PCT/IB2014/002031, filed Oct. 3, 2014, the contents of all of which are incorporated herein by reference and relied upon. But the present invention can also be used in devices other than watches which use fluids to activate precision mechanisms such as hydraulic systems which activate dosages or in a level indication system. The duel bellows system 100 includes: a main bellows 102 which interacts with a thermally compensating ("TC") bellows 104, whereby interaction of the main bellows 102 with TC bellows 104 results in a transfer of force and displacement that is insensitive to temperature changes.

The TC bellows 104 is disposed within a cavity 106 of the main bellows 102. The main bellows 102 of the dual bellows system 100 has at least a first liquid 108. The TC bellows 104 is made up of at least a second liquid 110. The liquid 108 of the main bellows 102 has different thermal properties than the liquid 110. The dual bellows system 100 also has at least one tube 112 and a tube manifold 114. The tube 112 of the dual bellows system 100 is in fluid communication with at least one other bellows 116.

The tube manifold 112 of the dual bellows system may be connected to a plurality bellows 116, 118, 120, 122. The several bellows 116, 118, 120, 122 of the dual bellows system 100 may be, as the particular application may require, of different cross-sections, the cross sections typically (but not necessarily) being cylindrical. The plurality of bellows 116, 118, 120, 122 may therefore generate varying forces ($F_{N+1}$) 124, 126, 128, 130 (and so on) and generate varying displacements ($D_{N+1}$) 132, 134, 136, 138 (and so on). The varying displacements $D_N$ are typically (but not necessarily) linear displacements. The dual bellows system 100 further has a crown 140 which provides a mechanical force ($F_1$) 142 and/or displacement ($D_1$) 144. The forces, displacements and cross-sections are mathematically dependent on one another.

The dual bellows system 100 has a first closed system 146 (within bellows 104) and a second closed system 148 (bellows 102 and all other bellows in fluid communication therewith). The force and/or displacement from the first closed system 146 is transferred to the second closed system 148.

By virtue of the above arrangement, temperature fluctuations have no or minimal effect on the force and/or displacement produced in the second closed system.

The present patent application incorporates by reference in its entirety U.S. Provisional Patent Application Ser. No. 61/623,160 filed 12 Apr. 2012, U.S. Provisional Patent Application 61/793,013 filed on 15 Mar. 2013, and U.S. patent application Ser. No. 14/391,395 filed on 9 Oct. 2014, all entitled "Compensated Capillary Indicator."

The present patent application further incorporates by reference in its entirety U.S. Provisional Patent Application Ser. No. 61/787,727 filed 15 Mar. 2013, and US Provisional Patent Application, entitled "Temperature Driven Winding System".

The present patent application incorporates by reference in its entirety U.S. Provisional patent application Ser. No. 13/391,386 filed 21 Feb. 2012.

In a principal advantage of the invention, a system is provided in which a transfer of force and/or displacement is insensitive to temperature changes.

In another advantage, a system is provided which is intellectually stimulating and interesting to observe, such as in a watch movement.

It should be appreciated that the particular implementations shown and described herein are representative of the invention and its best mode and are not intended to limit the scope of the present invention in any way. Furthermore, any connecting lines shown in the various figures contained herein are intended to represent exemplary functional relationships and/or physical couplings between various elements. It should be noted that many alternative or additional physical connections or functional relationships may be present and apparent to someone of ordinary skill in the field.

Moreover, the apparatus, system and/or method contemplate the use, sale and/or distribution of any goods, services or information having similar functionality described herein.

The specification and figures are to be considered in an illustrative manner, rather than a restrictive one and all modifications described herein are intended to be included within the scope of the invention claimed, even if such is not specifically claimed at the filing of the application. Accordingly, the scope of the invention should be determined by the claims appended hereto or later amended or added, and their legal equivalents rather than by merely the examples described above. For instance, steps recited in any method or process claims should be construed as being executable in any order and are not limited to the specific order presented in any claim. Further, the elements and/or components recited in any apparatus claims may be assembled or otherwise operationally configured in a variety of permutations to produce substantially the same result as the present invention. Consequently, the invention is not limited to the specific configuration recited in the claims.

Benefits, other advantages and solutions mentioned herein are not to be construed as necessary, critical, or essential features or components of any or all the claims.

As used herein, the terms "comprises", "comprising", or any variation thereof, are intended to refer to a non-exclusive listing of elements, such that any process, method, article, composition or apparatus of the invention that comprises a list of elements does not include only those elements recited, but may also include other elements described in this specification. The use of the term "consisting" or "consisting of" or "consisting essentially of" is not intended to limit the scope of the invention to the enumerated elements named thereafter, unless otherwise indicated. Other combinations and/or modifications of the above-described elements, materials or structures used in the practice of the present invention may be varied or otherwise adapted by the skilled artisan to other design without departing from the general principles of the invention.

The patents and articles mentioned above are hereby incorporated by reference herein, unless otherwise noted, to the extent that the same are not inconsistent with this disclosure.

Other characteristics and modes of execution of the invention are described in the appended claims.

Further, the invention should be considered as comprising all possible combinations of every feature described in the instant specification, appended claims, and/or drawing figures which may be considered new, inventive and industrially applicable.

Multiple variations and modifications are possible in the embodiments of the invention described here. Although certain illustrative embodiments of the invention have been shown and described here, a wide range of modifications, changes, and substitutions is contemplated in the foregoing disclosure. While the above description contains many specifics, these should not be construed as limitations on the scope of the invention, but rather as exemplifications of one or another preferred embodiment thereof. In some instances, some features of the present invention may be employed without a corresponding use of the other features. Accordingly, it is appropriate that the foregoing description be construed broadly and understood as being given by way of illustration and example only, the spirit and scope of the invention being limited only by the claims which ultimately issue in this application.

What is claimed is:

1. A bellows system, comprising: a main bellows containing a first fluid, the main bellows interacting with a thermally compensating bellows containing a second fluid isolated from the first fluid, whereby interaction of the main bellows with the thermally compensating bellows results in a transfer of force and displacement that is insensitive to temperature changes in which the system includes a plurality of bellows of different cross-sections, the bellows system further comprising an activator which transmits a mechanical force and/or displacement into the bellows system.

2. The bellows system of claim 1, in which the thermally compensating bellows rests within a cavity of the main bellows.

3. The bellows system of claim 1, in which the main bellows comprises a first liquid, and the thermally compensating bellows comprises a second liquid.

4. The bellows system of claim 1 further comprising at least one tube.

5. The bellows system of claim 1 in which at least one tube comprises a tube manifold.

6. The bellows system of claim 1 in which at least one tube is in fluid communication with at least one bellows.

7. The bellows system of claim 1 in which the tube manifold is connected to a plurality bellows.

8. The bellows system of claim 1 in which the plurality of bellows generate varying forces and generate varying displacements.

9. The bellows system of claim 1 in which the forces, displacements and cross-sections of the bellows are mathematically dependent on one another.

10. A bellows system, comprising: a main bellows containing a first fluid which interacts with a thermally compensating bellows containing a second fluid, whereby interaction of the main bellows with thermally compensating bellows results in a transfer of force and displacement that is insensitive to temperature changes in which the system includes a plurality of bellows of different cross-sections, the cross sections being optionally cylindrical, the bellows system further comprising an activator which transmits a mechanical force and/or displacement into the bellows system, wherein the first liquid has different thermal properties than the second liquid.

11. A bellows system, comprising: a main bellows containing a first fluid, the main bellows interacting with a thermally compensating bellows containing a second fluid, whereby interaction of the main bellows with thermally compensating bellows results in a transfer of force and displacement that is insensitive to temperature changes in which the system includes a plurality of bellows of different cross-sections, the cross sections being optionally cylindrical, the bellows system further comprising an activator which transmits a mechanical force and/or displacement into the bellows system, wherein the system comprises a first closed system and a second closed system, whereby the force and/or displacement from the first closed system is transferred to the second closed system.

12. The bellows system of claim 11, wherein temperature fluctuations have no or minimal effect on the force and/or displacement produced in the second closed system.

13. A bellows system, comprising: a main bellows containing a first fluid, the main bellows interacting with a thermally compensating bellows containing a second fluid isolated from the first fluid, whereby interaction of the main bellows with thermally compensating bellows results in a transfer of force and displacement that is insensitive to temperature changes in which a plurality of bellows generate varying forces and generate varying displacements.

14. A bellows system, comprising: a main bellows containing a first fluid, the main bellows interacting with a thermally compensating bellows containing a second fluid isolated from the first fluid, whereby interaction of the main bellows with thermally compensating bellows results in a transfer of force and displacement that is insensitive to temperature changes in which the forces, displacements and cross-sections of the bellows being mathematically dependent on one another.

15. A bellows system, comprising: a main bellows containing a first fluid, the main bellows interacting with a thermally compensating bellows containing a second fluid isolated from the first fluid, whereby interaction of the main bellows with thermally compensating bellows results in a transfer of force and displacement that is insensitive to temperature changes.

16. A bellows system, comprising:
 a. a main bellows housing for storage and displacement of a first liquid having a direction of thermal expansion, the housing made of a flexible, liquid-tight material and comprising:
  i. an upper portion,
  ii. a lower portion,
  iii. an outer accordion portion sealingly connected along a periphery with the upper and lower portions, and
  iv. at least one entry/exit port formed on at least one of the portions thereof, and
 b. a temperature compensation device including a second bellows which thermally expands in a direction other than the direction of thermal expansion of the first bellows, comprising:
  i. a second bellows housing;
  ii. a second liquid contained in the second bellows housing;
  iii. a support arrangement for the second bellows housing such that the thermal expansion of the first liquid which causes an expansion of the main bellows at a first expansion rate is mitigated by the thermal expansion of the second liquid at a second expansion rate
 c. at least one secondary bellows in fluidic connection with the main bellows, whereby interaction of the main bellows (a) with the temperature compensation device (b) results in a transfer of force and displacement via the first liquid to the secondary bellows (c) that is insensitive to temperature changes.

* * * * *